US 12,504,077 B2

(12) United States Patent
Matsushita et al.

(10) Patent No.: US 12,504,077 B2
(45) Date of Patent: Dec. 23, 2025

(54) SEALING DEVICE (71) Applicant: NOK CORPORATION, Tokyo (JP)

(72) Inventors: Koya Matsushita, Kumamoto (JP); Takuya Nishimura, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 18/292,817

(22) PCT Filed: Jul. 26, 2022

(86) PCT No.: PCT/JP2022/028697
§ 371 (c)(1),
(2) Date: Jan. 26, 2024

(87) PCT Pub. No.: WO2023/008403
PCT Pub. Date: Feb. 2, 2023

(65) Prior Publication Data
US 2024/0271703 A1 Aug. 15, 2024

(30) Foreign Application Priority Data

Jul. 28, 2021 (JP) .................................. 2021-123656

(51) Int. Cl.
*F16J 15/34* (2006.01)
(52) U.S. Cl.
CPC ................................ F16J 15/3416 (2013.01)
(58) Field of Classification Search
CPC ................................................... F16J 15/3416
See application file for complete search history.

(56) References Cited

U.S. PATENT DOCUMENTS

| 2,841,429 | A | * | 7/1958 | Mccuistion | .......... | F16J 15/3236 |
| | | | | | | 277/587 |
| 3,347,556 | A | * | 10/1967 | Fleckenstein | ............ | F16J 15/32 |
| | | | | | | 277/566 |
| 3,642,293 | A | | 2/1972 | Woodling | | |
| 3,822,068 | A | * | 7/1974 | Litherland | ........... | F16J 15/3236 |
| | | | | | | 277/529 |
| 4,687,212 | A | * | 8/1987 | Timpson, Jr. | ........ | F16J 15/3236 |
| | | | | | | 277/556 |

(Continued)

FOREIGN PATENT DOCUMENTS

| CN | 107289131 | 10/2017 |
| JP | 9-96364 | 4/1997 |

(Continued)

*Primary Examiner* — Vishal A Patel
(74) *Attorney, Agent, or Firm* — GREENBLUM & BERNSTEIN, P.L.C.

(57) ABSTRACT

A sealing device includes an inner peripheral surface that is a surface facing an outer peripheral surface of a shaft, and an outer peripheral surface that is a surface facing an inner peripheral surface of a shaft hole. The inner peripheral surface has an inner peripheral recessed surface that is an annular surface recessed to an outer periphery side. The outer peripheral surface has an outer peripheral recessed surface that is an annular surface recessed to an inner periphery side. The inner peripheral recessed surface of the inner peripheral surface contacts the outer peripheral surface of the shaft. The outer peripheral recessed surface of the outer peripheral surface contacts the inner peripheral surface of the shaft hole.

2 Claims, 8 Drawing Sheets

(56) References Cited

U.S. PATENT DOCUMENTS

| | | | | |
|---|---|---|---|---|
| 5,205,568 A * | 4/1993 | Stoll | ............... | F16L 33/227 |
| | | | | 285/104 |
| 5,735,531 A * | 4/1998 | Jordan | ............... | F16J 15/32 |
| | | | | 277/500 |
| 5,799,953 A * | 9/1998 | Henderson | ......... | F16J 15/3236 |
| | | | | 277/567 |
| 6,290,235 B1 | 9/2001 | Albertson | | |
| 6,769,697 B1 * | 8/2004 | Ishikawa | ............ | F16J 15/0887 |
| | | | | 277/612 |
| 6,802,513 B2 * | 10/2004 | Ranzau | ............... | F16J 15/025 |
| | | | | 277/648 |
| 7,445,047 B2 * | 11/2008 | Gomez | ............... | F16J 15/20 |
| | | | | 277/342 |
| 7,604,243 B2 * | 10/2009 | Zitting | ............... | F16J 15/3236 |
| | | | | 277/584 |
| 8,393,400 B2 * | 3/2013 | Buckle | ............... | E21B 33/04 |
| | | | | 166/368 |
| 9,234,612 B2 * | 1/2016 | Santi | ............... | F16L 17/02 |
| 10,648,562 B2 * | 5/2020 | Yu | ............... | F16J 15/062 |
| 10,794,064 B2 * | 10/2020 | Tuynman | ............ | F16J 15/025 |
| 2020/0072354 A1 | 3/2020 | Umeda et al. | | |

FOREIGN PATENT DOCUMENTS

| | | |
|---|---|---|
| JP | 9-144889 | 6/1997 |
| JP | 2001-032945 | 2/2001 |
| JP | 2005-155743 | 6/2005 |
| JP | 2007-255697 | 10/2007 |
| JP | 2010-14202 | 1/2010 |
| JP | 2012-159138 | 8/2012 |
| JP | 2018-173089 | 11/2018 |

* cited by examiner

SEALING DEVICE

CROSS REFERENCE TO RELATED APPLICATIONS

The present application is a U.S. National Stage application of International Patent Application No. PCT/JP2022/028697, filed Jul. 26, 2022, which claims the benefit of Japanese Patent Application No. 2021-123656, filed Jul. 28, 2021. The contents of these applications are incorporated herein by reference in their entirety.

BACKGROUND

Technical Field

The present disclosure relates to a sealing device.

Description of the Related Art

Sealing devices have been conventionally used to seal the space between members capable of relative movement such as rotational movement. Some of such sealing devices close a gap between the shaft and the hole in which the shaft is inserted or the cylindrical surface, and form two separated spaces, for example. Such sealing devices are required to reduce resistance to rotation (rotational resistance) and improve sealing performance, and various proposals have been made therefor (for example, see Japanese Patent Application Publication No. 2018-173089).

SUMMARY

As described above, some of the conventional sealing devices have a configuration to reduce rotational resistance and improve sealing performance, and in some cases, it is required to improve the sealing performance regarding oozing and leakage of the sealed object such as a working fluid due to the rotational movement in both directions of the attaching target of the sealing deice such as a shaft.

The present disclosure relates to the aforementioned problems.

A sealing device according to the present disclosure is a sealing device that is annular around an axis to seal an annular space between a shaft and a shaft hole in which the shaft is inserted, and includes an inner peripheral surface that is a surface facing a surface on an inner periphery side of respective surfaces facing each other via the space, of the shaft and the shaft hole, and an outer peripheral surface that is a surface facing a surface on an outer periphery side of the respective surfaces facing each other via the space, of the shaft and the shaft hole, and characterized in that the inner peripheral surface has an inner peripheral recessed surface that is a surface recessed to the outer periphery side and annular around the axis, the outer peripheral surface has an outer peripheral recessed surface that is a surface recessed to the inner periphery side and annular around the axis, the inner peripheral recessed surface of the inner peripheral surface contacts a surface on the inner periphery side of respective surfaces facing each other via the space, of the shaft or the shaft hole, and the outer peripheral recessed surface of the outer peripheral surface contacts a surface on the outer periphery side of the respective surfaces facing via the space, of the shaft or the shaft hole.

In the sealing device according one aspect of the present disclosure, in a section along the axis of the sealing device, a portion located in a position farthest from the axis in a direction orthogonal to the axis, of the inner peripheral recessed surface is provided in a center or substantially center in the axis direction, of the inner peripheral recessed surface, and in the section along the axis of the sealing device, a portion located in a position closest to the axis in the direction orthogonal to the axis, of the outer peripheral recessed surface is provided in a center or substantially center in the axis direction, of the outer peripheral recessed surface.

In the sealing device according to one aspect of the present disclosure, in a section along the axis of the sealing device, a portion located in a position farthest from the axis in a direction orthogonal to the axis, of the inner peripheral recessed surface is provided on one side in the axis direction, of the inner peripheral recessed surface, and in the section along the axis of the sealing device, a portion located in a position closest to the axis in the direction orthogonal to the axis, of the outer peripheral recessed surface is provided on the one side in the axis direction, of the outer peripheral recessed surface, and the one side in the axis direction is a side to be a side of a sealed object.

In the sealing device according to one aspect of the present disclosure, by the inner peripheral recessed surface, inner peripheral protruded surfaces that are a pair of surfaces that protrude toward the inner periphery side and are annular around the axis are formed on both ends of the inner peripheral surface in the axis direction, and by the outer peripheral recessed surface, outer peripheral protruded surfaces that are a pair of surfaces that protrude toward the outer periphery side and are annular around the axis are formed on both ends of the outer peripheral surface in the axis direction.

In the sealing device according to one aspect of the present disclosure, the shaft or the shaft hole performs bidirectional rotational movement.

According to the sealing device of the present disclosure, sealing performance concerning oozing and leakage of a sealed object based on bidirectional rotational movement of an attaching target of the sealing device can be improved.

DETAILED DESCRIPTION

Hereinafter, embodiments of the present disclosure will be described with reference to the drawings.

Figure 1:
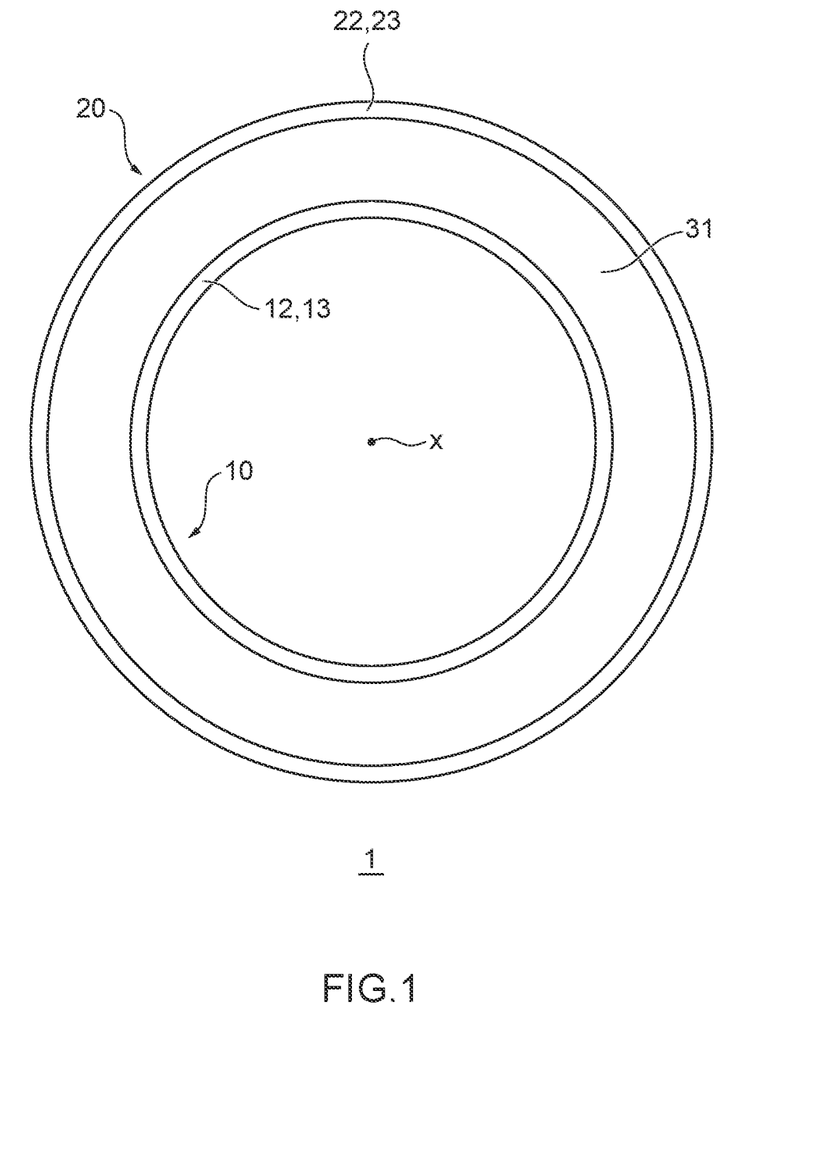
FIG. 1 A plan view of a sealing device according to an embodiment of the present disclosure.
Figure 2:
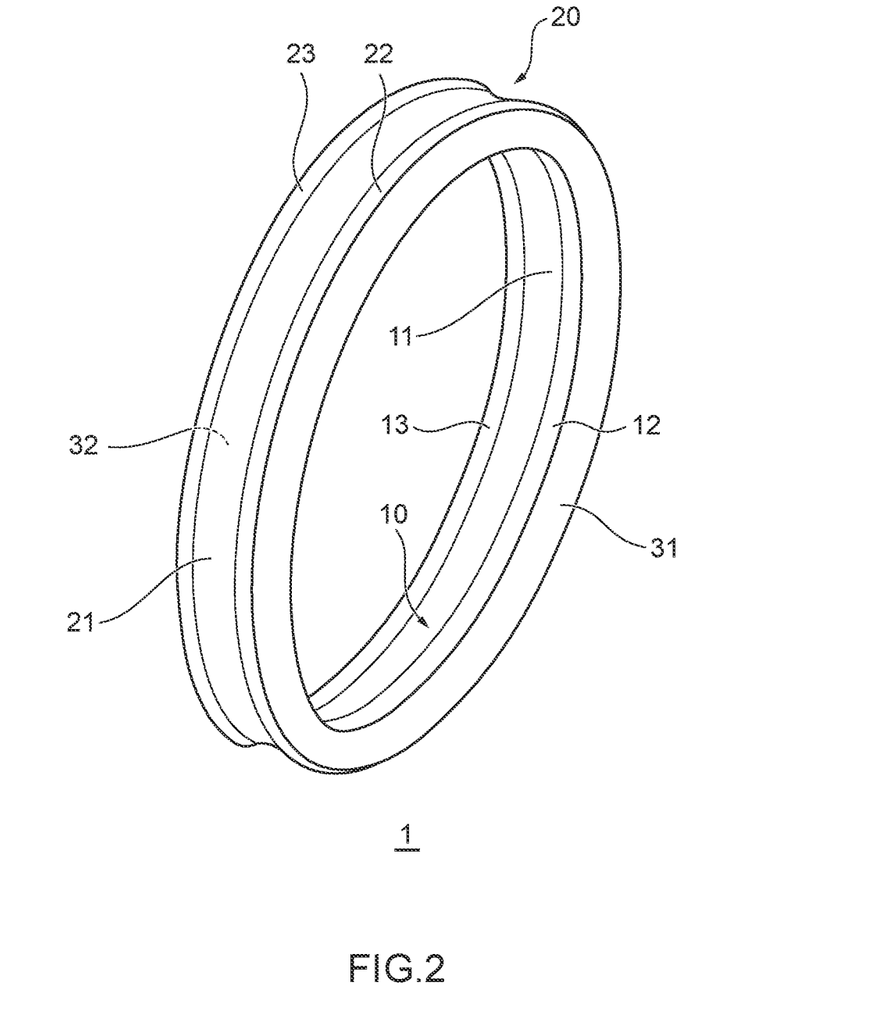
FIG. 2 A perspective view of the sealing device illustrated in FIG. 1.
Figure 3:
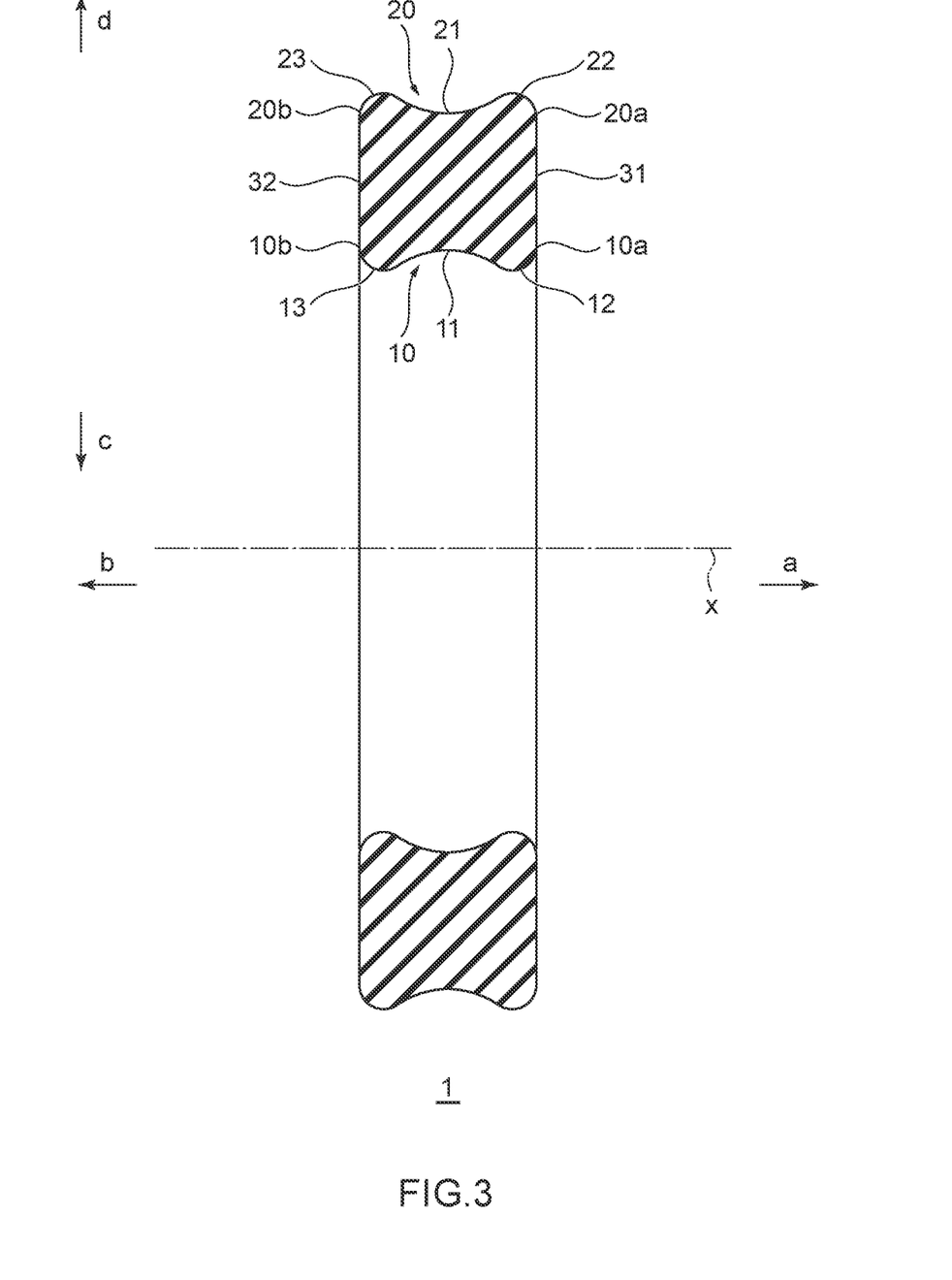
FIG. 3 A sectional view in a section along an axis of the sealing device illustrated in FIG. 1.
Figure 4:
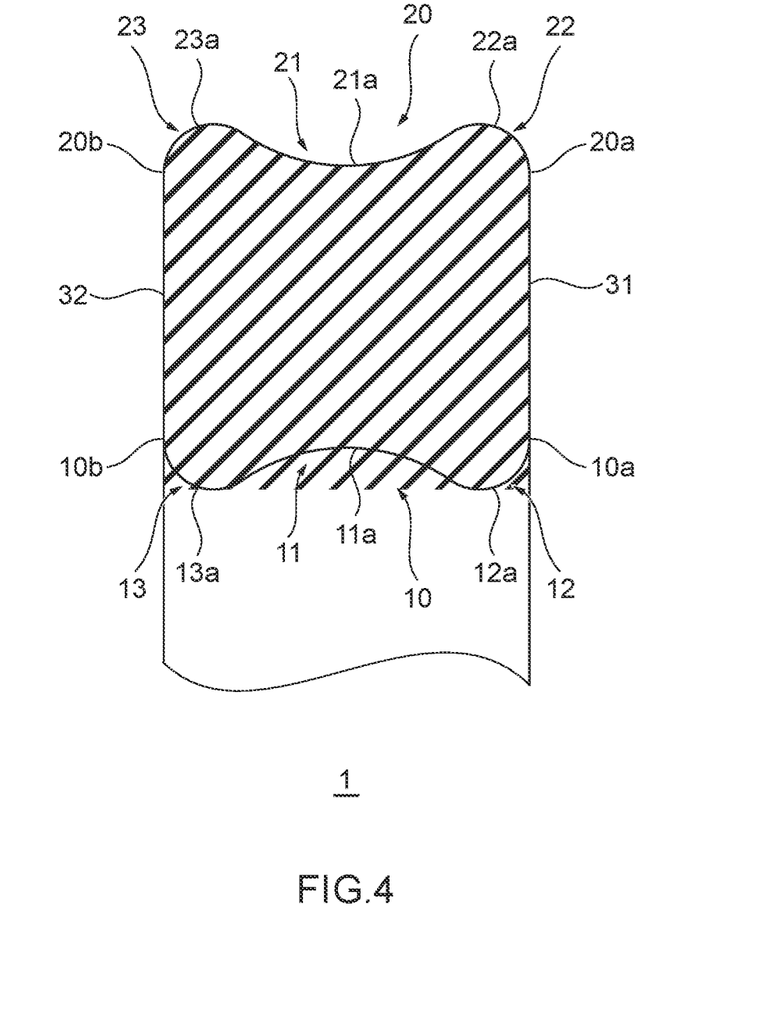
FIG. 4 A sectional view enlarging and illustrating one side of the section illustrated in FIG. 3.

FIG. 1 is a plan view of a sealing device 1 according to a first embodiment of the present disclosure, FIG. 2 is a perspective view of the sealing device 1, and FIG. 3 is a sectional view in a section along an axis x of the sealing device 1. FIG. 4 is a sectional view enlarging and illustrating one side of the section illustrated in FIG. 3. Hereinafter, for convenience of explanation, a side (one side) in an arrow "a" (see FIG. 3) direction is defined as a sealed object side, and a side in an arrow "b" (see FIG. 3) direction is defined as an atmosphere side. The object to be sealed is an object to be sealed by the sealing device 1, and a side where the object to be sealed exists, or the side where the object to be sealed is to exist is a sealed object side. The atmosphere side is a side opposite to the sealed object side, and is a side that is to be opened to atmosphere. The atmosphere side does not have to be opened to atmosphere, and another object to be sealed may exist. Further, a side in an arrow "c" (see FIG. 3) direction is defined as an inner periphery side, and a side in an arrow "d" (see FIG. 3) direction is defined as an outer periphery side.

The sealing device 1 according to the present embodiment is a sealing device for sealing an annular space between a shaft that is an attaching target of the sealing device 1 and a shaft hole that is an attaching target of the sealing device 1 in which the shaft is inserted. The sealing device 1 is annular around the axis x. The sealing device 1 includes an inner peripheral surface 10 that is a surface facing a surface on an inner periphery side (outer peripheral surface of the shaft) of respective surfaces facing each other via the space, of the shaft and the shaft hole, and an outer peripheral surface 20 that is a surface facing a surface on an outer periphery side (inner peripheral surface of the shaft hole) of the respective surfaces facing each other via the space, of the shaft and the shaft hole. The inner peripheral surface 10 has an inner peripheral recessed surface 11 that is recessed to the outer periphery side and is a surface annular around the axis x. The outer peripheral surface 20 has an outer peripheral recessed surface 21 that is recessed to the inner periphery side and is a surface annular around the axis x. The inner peripheral recessed surface 11 of the inner peripheral surface 10 is configured to contact the outer peripheral surface of the shaft. The outer peripheral recessed surface 21 of the outer peripheral surface 20 is configured to contact the inner peripheral surface of the shaft hole. Hereinafter, the sealing device 1 will be specifically described.

The attaching targets for which the sealing device 1 is used include a vehicle, construction machinery, industrial machinery, general purpose machines or the like, and in the attaching targets, the sealing device 1 is used to seal between the shaft that relatively moves and the shaft hole which is formed in a housing or the like and in which this shaft is inserted. The sealing device 1 is favorably used in a damper, a valve or the like in which a shaft or a shaft hole performs bidirectional rotational movement that rotationally moves in both directions of one rotation direction such as a positive direction or a negative direction and another rotation direction opposite to the one rotation direction. Note that the attaching targets to which the sealing device 1 according to the embodiment of the present disclosure is applied are not limited to the above.

As illustrated in FIGS. 1 and 2, the sealing device 1 is an annular or substantially annular member with the axis x as a center axis or substantially center axis, and has the inner peripheral surface 10 and the outer peripheral surface 20 that face in opposite directions to each other as described above. Further, the sealing device 1 has a side surface 31 and a side surface 32 that are surfaces that face in opposite directions to each other. The side surface 31 is a surface extending between an end on the sealed object side (sealing side end 10a) of the inner peripheral surface 10 and an end on the sealed object side (sealing side end 20a) of the outer peripheral surface 20, and the side surface 32 is a surface extending between an end on the atmosphere side (atmosphere side end 10b) of the inner peripheral surface 10 and an end on the atmosphere side (atmosphere side end 20b) of the outer peripheral surface 20. As illustrated in FIGS. 3 and 4, a shape (hereinafter, also simply referred to as a sectional shape) of a section (hereinafter, also simply referred to as a section) along the axis x of the sealing device 1 is a substantial rectangle.

As illustrated in FIGS. 1 and 2, the inner peripheral surface 10 extends over an extending direction of the sealing device 1, and is a surface having an annular shape or substantially annular shape with the axis x as the center axis or substantially center axis, and a sectional shape (FIGS. 3 and 4) of the inner peripheral surface 10 is uniform or substantially uniform over the extending direction (circumferential direction) of the sealing device 1. Further, the inner peripheral surface 10 has the aforementioned inner peripheral recessed surface 11, and inner peripheral protruded surfaces 12 and 13 formed on both sides of the inner peripheral recessed surface 11 by the inner peripheral recessed surface 11.

As illustrated in FIGS. 3 and 4, the inner peripheral recessed surface 11 is formed so that a bottom-most portion 11a of the inner peripheral recessed surface 11 is provided in a center or substantially center in an axis x direction of the inner peripheral recessed surface 11 in a section along the axis x of the sealing device 1. In the section, the bottom-most portion 11a is a portion that is located in a farthest position from the axis x in a direction orthogonal to the axis x of the inner peripheral recessed surface 11. Specifically, the inner peripheral recessed surface 11 is formed so that an outline in the section of the inner peripheral recessed surface 11 draws an arc-shaped or substantially arc-shaped line, and the bottom-most portion 11a of the inner peripheral recessed surface 11 is formed to be located in the center or substantially center in the axis x direction of the inner peripheral recessed surface 11, in the section. In other words, in the section, the inner peripheral recessed surface 11 is symmetrical or substantially symmetrical about the bottom-most portion 11a. The inner peripheral recessed surface 11 is not limited to the one having the shape presenting arc-shaped or substantially arc-shaped shape in the section, but may have other shapes such as a shape presenting an outline drawn by a curved line in the section, a shape presenting an outline drawn by a combination of straight lines in the section, and a shape presenting an outline drawn by a combination of a curved line and a straight line in the section. However, the inner peripheral recessed surface 11 preferably has a shape drawing a smooth line in the section.

As illustrated in FIGS. 3 and 4, inner peripheral protruded surfaces 12 and 13 that are a pair of surfaces that protrude toward the inner periphery side and are annular around the axis x are formed on both ends of the inner peripheral recessed surface 11 of the inner peripheral surface 10 by the inner peripheral recessed surface 11. The inner peripheral protruded surface 12 is located on the sealed object side with respect to the inner peripheral recessed surface 11, and the inner peripheral protruded surface 13 is located on the atmosphere side with respect to the inner peripheral recessed surface 11. In the section, a protrusion end portion 12a that is a portion located in a position closest to the axis x in the direction orthogonal to the axis x of the inner peripheral protruded surface 12 is located on the inner periphery side in the direction orthogonal to the axis x from the inner peripheral recessed surface 11. Likewise, in the section, a protrusion end portion 13a that is a portion located in a position closest to the axis x in the direction orthogonal to the axis x of the inner peripheral protruded surface 13 is located on the inner periphery side in the direction orthogonal to the axis x from the inner peripheral recessed surface 11. Note that in the section, the protrusion end portion 12a of the inner peripheral protruded surface 12 may be located in a same position in the direction orthogonal to the axis x as a connection portion with the inner peripheral protruded surface 12, of the inner peripheral recessed surface 11, and likewise, in the section, the protrusion end portion 13a of the inner peripheral protruded surface 13 may be located in the same position in the direction orthogonal to the axis x as a connection portion with the inner peripheral protruded surface 13, of the inner peripheral recessed surface 11. In the section, the protrusion end portion 12a of the inner peripheral protruded surface 12 and the protrusion end portion 13a of the inner peripheral protruded surface 13 may be located in a same position in the direction orthogonal to the axis x or may be located in different positions.

The inner peripheral protruded surfaces 12 and 13 are provided on both the ends of the inner peripheral surface 10 in the axis x direction, as illustrated in FIGS. 3 and 4, for example. The inner peripheral protruded surfaces 12 and 13 do not have to be provided on both the ends of the inner peripheral surface 10 in the axis x direction. In that case, the inner peripheral surface 10 further continues to the sealed object side from the inner peripheral protruded surface 12, and the inner peripheral surface 10 further continues to the atmosphere side from the inner peripheral protruded surface 13.

As illustrated in FIGS. 1 and 2, the outer peripheral surface 20 extends over an extending direction of the sealing device 1, and is a surface having an annular shape or substantially annular shape with the axis x as the center axis or substantially center axis, and a sectional shape (FIGS. 3 and 4) is uniform or substantially uniform over the extending direction (circumferential direction) of the sealing device 1. Further, the outer peripheral surface 20 has the aforementioned outer peripheral recessed surface 21, and outer peripheral protruded surfaces 22 and 23 that are formed on both sides of the outer peripheral recessed surface 21 by the outer peripheral recessed surface 21.

As illustrated in FIGS. 3 and 4, the outer peripheral recessed surface 21 is formed so that a bottom-most portion 21a of the outer peripheral recessed surface 21 is provided in a center or substantially center in an axis x direction of the outer peripheral recessed surface 21 in the section along the axis x of the sealing device 1. In the section, the bottom-most portion 21a is a portion that is located in a position closest to the axis x in the direction orthogonal to the axis x of the outer peripheral recessed surface 21. Specifically, the outer peripheral recessed surface 21 is formed so that an outline in the section of the outer peripheral recessed surface 21 draws an arc-shaped or substantially arc-shaped line, the bottom-most portion 21a of the outer peripheral recessed surface 21 is formed to be located in the center or substantially center in the axis x direction of the outer peripheral recessed surface 21, in the section. In other words, in the section, the outer peripheral recessed surface 21 is symmetrical or substantially symmetrical about the bottom-most portion 21a. The outer peripheral recessed surface 21 is not limited to the one having the shape presenting an arc-shaped or substantially arc-shaped outline in the section, but may have other shapes such as a shape presenting an outline drawn by a curved line in the section, a shape presenting an outline drawn by a combination of straight lines in the section, and a shape presenting an outline drawn by a combination of a curved line and a straight line in the section. However, the outer peripheral recessed surface 21 preferably has a shape drawing a smooth line in the section.

As illustrated in FIGS. 3 and 4, outer peripheral protruded surfaces 22 and 23 that are a pair of surfaces that protrude toward the outer periphery side and are annular around the axis x are formed on both ends of the outer peripheral recessed surface 21 of the outer peripheral surface 20 by the outer peripheral recessed surface 21. The outer peripheral protruded surface 22 is located on the sealed object side with respect to the outer peripheral recessed surface 21, and the outer peripheral protruded surface 23 is located on the atmosphere side with respect to the outer peripheral recessed surface 21. In the section, a protrusion end portion 22a that is a portion located in a position farthest from the axis x in the direction orthogonal to the axis x of the outer peripheral protruded surface 22 is located on the outer periphery side in the direction orthogonal to the axis x from the outer peripheral recessed surface 21. Likewise, in the section, a protrusion end portion 23a that is a portion located in a position farthest from the axis x in the direction orthogonal to the axis x of the outer peripheral protruded surface 23 is located on the outer periphery side in the direction orthogonal to the axis x from the outer peripheral recessed surface 21. Note that in the section, the protrusion end portion 22a of the outer peripheral protruded surface 22 may be located in a same position in the direction orthogonal to the axis x as a connection portion with the outer peripheral protruded surface 22, of the outer peripheral recessed surface 21, and likewise, in the section, the protrusion end portion 23a of the outer peripheral protruded surface 23 may be located in the same position in the direction orthogonal to the axis x as a connection portion with the outer peripheral protruded surface 23, of the outer peripheral recessed surface 21. In the section, the protrusion end portion 22a of the outer peripheral protruded surface 22 and the protrusion end portion 23a of the outer peripheral protruded surface 23 may be located in a same position in the direction orthogonal to the axis x or may be located in different positions.

The outer peripheral protruded surfaces 22 and 23 are provided on both the ends of the outer peripheral surface 20 in the axis x direction, as illustrated in FIGS. 3 and 4, for example. The outer peripheral protruded surfaces 22 and 23 do not have to be provided on both the ends of the outer peripheral surface 20 in the axis x direction. In this case, the outer peripheral surface 20 further continues to the sealed object side from the outer peripheral protruded surface 22, and the outer peripheral surface 20 further continues to the atmosphere side from the outer peripheral protruded surface 23.

The sealing device 1 is formed so that the inner peripheral recessed surface 11 contacts an outer peripheral surface of the shaft (bottom surface of a groove) as described later in the usage state where the sealing device 1 is attached to the attaching targets. Further, the sealing device 1 is formed so that the outer peripheral recessed surface 21 contacts the inner peripheral surface of the shaft hole as described later in the usage state of the sealing device 1. In other words, in the usage state of the sealing device 1 described later, in a range of the inner peripheral recessed surface 11 and the outer peripheral recessed surface 21, the sealing device 1 is sandwiched between the outer peripheral surface of the shaft and the inner peripheral surface of the shaft hole, and a compression rate in the direction orthogonal to the axis x or the direction substantially orthogonal to the axis x is 0% or more.

As illustrated in FIGS. 1 and 2, the side surfaces 31 and 32 extend over the extending direction of the sealing device 1, and are surfaces having an annular shape or substantially annular shape with the axis x as the center axis or substantially center axis, and a sectional shape (FIGS. 3 and 4) is uniform or substantially uniform over the extending direction (circumferential direction) of the sealing device 1. Further, as illustrated in FIGS. 3 and 4, the side surfaces 31 and 32 extend along a plane orthogonal to the axis x, and extend parallel or substantially parallel to the plane orthogonal to the axis x, for example.

The inner peripheral protruded surfaces 12 and 13 are symmetrical or substantially symmetrical about the straight line orthogonal to the axis x in the section, and the outer peripheral protruded surfaces 22 and 23 are symmetrical or substantially symmetrical about the straight line orthogonal to the axis x in the section. Further, the inner peripheral protruded surface 12 and the outer peripheral protruded surface 22 are symmetrical or substantially symmetrical about a straight line parallel to the axis x in the section. Further, the inner peripheral protruded surface 13 and the outer peripheral protruded surface 23 are symmetrical or substantially symmetrical about a straight line parallel to the axis x in the section. Further, the inner peripheral recessed surface 11 and the outer peripheral recessed surface 21 are symmetrical or substantially symmetrical about a straight line parallel to the axis x in the section. The inner peripheral protruded surfaces 12 and 13 do not have to be symmetrical about the straight line orthogonal to the axis x in the section. Further, the outer peripheral protruded surfaces 22 and 23 do not have to be symmetrical about the straight line orthogonal to the axis x in the section. Further, the inner peripheral protruded surface 12 and the outer peripheral protruded surface 22 do not have to be symmetrical about the straight line parallel to the axis x in the section. Further, the inner peripheral protruded surface 13 and the outer peripheral protruded surface 23 do not have to be symmetrical about the straight line parallel to the axis x in the section. Further, the inner peripheral recessed surface 11 and the outer peripheral recessed surface 21 do not have to be symmetrical about the straight line parallel to the axis x in the section.

The sealing device 1 is a rubber-like elastic body, and as a rubber material of the sealing device 1, for example, fluororubber (FKM), ethylene propylene rubber (EPDM), hydrogenated nitrile rubber (H-NBR), nitrile rubber (NBR), acrylic rubber (ACM), ethylene acrylic rubber (AEM), vinyl methyl silicone rubber (VMQ), fluorosilicone rubber (FVMQ) and the like are listed. The sealing device 1 is integrally made from the rubber-like elastic body.

Thereafter, an operation of the sealing device 1 having the aforementioned configuration will be described.

Figure 5:
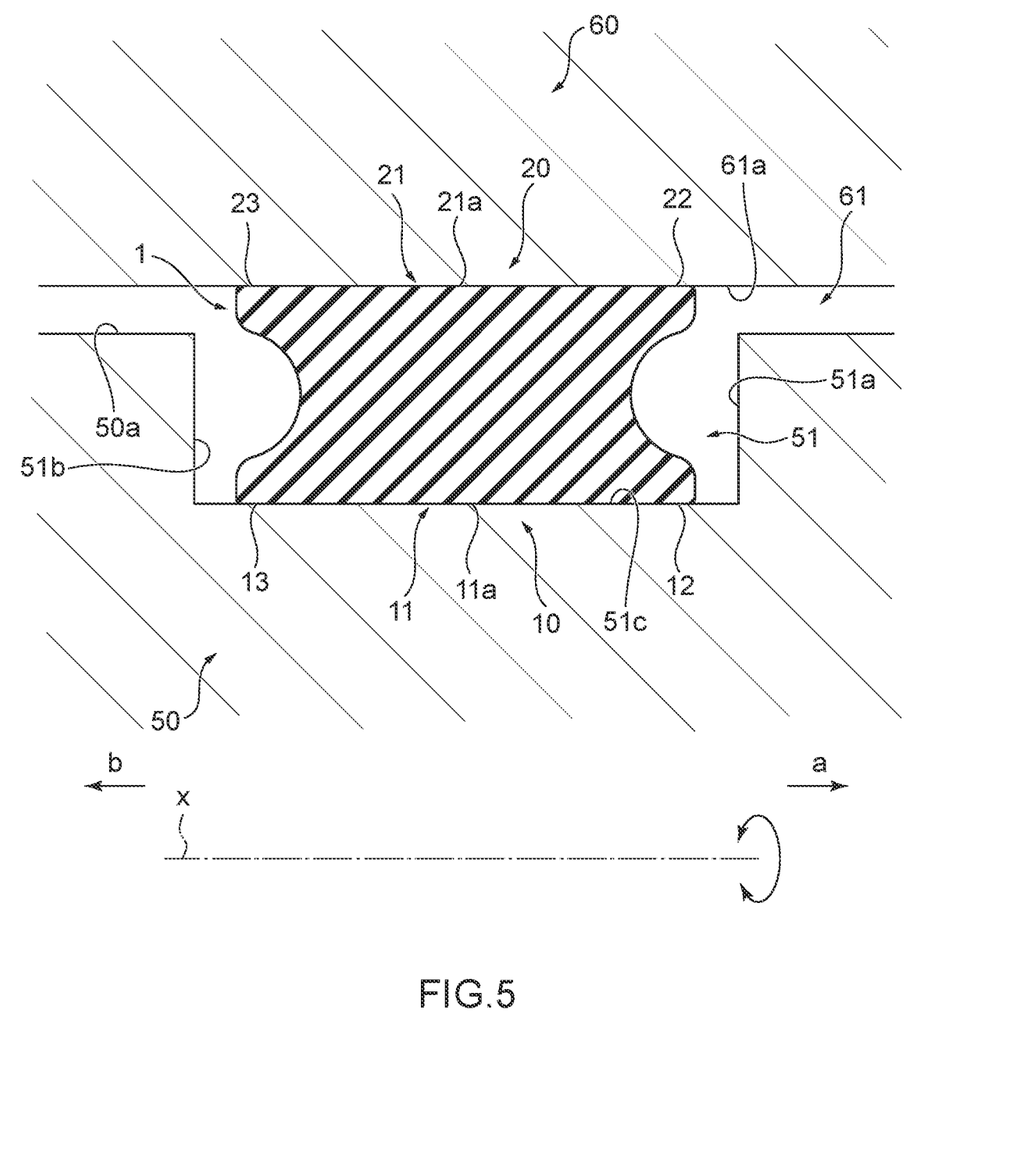
FIG. 5 A sectional view illustrating a sealing device in a usage state where the sealing device illustrated in FIG. 1 is attached to a shaft and a shaft hole of a housing that are attaching targets.

The sealing device 1 is used to seal an annular space between a shaft and a shaft hole in which the shaft is inserted, as described above. The sealing device 1 is designed to seal an annular space between a shaft 50 and a shaft hole 61 in which the shaft 50 is inserted, as illustrated in FIG. 5, for example. The shaft hole 61 is a through-hole formed in a housing 60, and the housing 60 is a cylindrical or circular-cylindrical member, for example. In the shaft 50, an annular groove 51 is formed around an axis of the shaft 50, and the sealing device 1 is accommodated in the groove 51 to be brought into the usage state. Note that FIG. 5 is a sectional view illustrating the sealing device 1 in the usage state where the sealing device 1 is attached to the shaft 50 and the shaft hole 61 of the housing 60 that are the attaching targets.

The groove 51 is recessed from an outer peripheral surface 50a of the shaft 50, and opens to a space between the shaft 50 and the shaft hole 61 as illustrated in FIG. 5. Further, as illustrated in FIG. 5, the groove 51 has a pair of side surfaces 51a and 51b that face each other, and has a bottom surface 51c that extends between the side surfaces 51a and 51b. The side surface 51a is a side surface located on the sealed object side (arrow "a" direction side), and the side surface 51b is a side surface located on the atmosphere side (arrow "b" direction side). The groove 51 may be formed on an inner peripheral surface 61a of the shaft hole 61 of the housing 60 instead of the shaft 50. Further, the groove may be formed in the shaft 50 and the housing 60. The attaching target is, for example, a damper, a valve such as an EGR valve or the like, and the shaft 50 and the housing 60 rotationally move bidirectionally relative to each other. In the attaching target, the shaft 50 may perform bidirectional rotational movement and the housing 60 may be fixed, the shaft 50 may be fixed and the housing 60 may perform bidirectional rotational movement, or the shaft 50 and the housing 60 may mutually perform bidirectional rotational movement.

As illustrated in FIG. 5, the sealing device 1 in the usage state where the sealing device 1 is attached to the shaft 50 and the housing 60 that are the attaching targets is compressed between the bottom surface 51c of the groove 51 and the inner peripheral surface 61a of the shaft hole 61 of the housing 60, and closes a gap between the shaft 50 and the shaft hole 61 of the housing 60. Thereby, a space between the shaft 50 and the shaft hole 61 is sealed, and a space on the sealed object side is sealed. For example, when another object to be sealed is sealed in a space on the atmosphere side, the space on the atmosphere side is also sealed, and the space on the atmosphere side may be sealed by the sealing device 1.

As illustrated in FIG. 5, in the usage state, the sealing device 1 is compressed between the bottom surface 51c of the groove 51 and the inner peripheral surface 61a of the shaft hole 61 of the housing 60. At this time, the sealing device 1 also deforms in the axis x direction to extend in the axis x direction, and as described above, the entire inner peripheral recessed surface 11 of the sealing device 1 contacts the bottom surface 51c of the groove 51, whereas the entire outer peripheral recessed surface 21 of the sealing device 1 contacts the inner peripheral surface 61a of the shaft hole 61. At this time, in the range of the inner peripheral recessed surface 11 and the outer peripheral recessed surface 21, the compression rate of the sealing device 1 in the direction orthogonal to the axis x or the direction substantially orthogonal to the axis x is 0% or more.

The inner peripheral protruded surfaces 12 and 13 of the inner peripheral surface 10 of the sealing device 1 are pressed against the bottom surface 51c of the groove 51 of the shaft 50, and the outer peripheral protruded surfaces 22 and 23 of the outer peripheral surface 20 of the sealing device 1 are pressed against the inner peripheral surface 61a of the shaft hole 61.

In this way, in the sealing device 1 in the usage state, the entire inner peripheral recessed surface 11 contacts the bottom surface 51c of the groove 51 in addition to the inner peripheral protruded surfaces 12 and 13 of the inner peripheral surface 10. Therefore, a width in the axis x direction of a region that contacts the bottom surface 51c of the groove 51, of the sealing device 1 in the usage state is larger than a width in the axis x direction between the inner peripheral protruded surfaces 12 and 13 of the sealing device 1 in a free state with no load illustrated in FIGS. 1 to 4. Therefore, the sealing device 1 can increase a contact region (seal surface) to the bottom surface 51c of the groove 51 of the sealing device 1 in the usage state.

Likewise, in the sealing device 1 in the usage state, the entire outer peripheral recessed surface 21 contacts the inner peripheral surface 61a of the shaft hole 61, in addition to the outer peripheral protruded surfaces 22 and 23 of the outer peripheral surface 20. Therefore, a width in the axis x direction in a region that contacts the inner peripheral surface 61a of the shaft hole 61 of the sealing device 1 in the usage state is larger than a width in the axis x direction between the outer peripheral protruded surfaces 22 and 23 of the sealing device 1 in the free state with no load illustrated in FIGS. 1 to 4. Therefore, the sealing device 1 can increase a contact region to the inner peripheral surface 61a of the shaft hole 61 of the sealing device 1 in the usage state.

In this way, the sealing device 1 can increase the contact region to the bottom surface 51c of the groove 51, of the sealing device 1 in the usage state, can increase the contact region to the inner peripheral surface 61a of the shaft hole 61, of the sealing device 1 in the usage state, and can improve sealing performance of the sealing device 1.

At the time of switching of the direction of rotation of the shaft 50 or the housing 60 (returning of rotation) or when the shaft 50 is stationary, the sealed object may enter the contact surface on the inner peripheral surface 10 side of the sealing device 1 or the contact surface on the outer peripheral surface 20 side. In this case, it is also difficult for the sealed object that has entered the contact surface of the sealing device 1 to reach the atmosphere side on the opposite side, since the contact region of the sealing device 1 in the usage state is large as described above. In this way, the sealing device 1 can suppress oozing and leakage of the sealed object due to bidirectional rotational movement of the attaching targets.

Further, the inner peripheral protruded surfaces 12 and 13 of the inner peripheral surface 10 are high compression portions, and surface pressure of the contact surface of the sealing device 1 shows distinction in the inner peripheral protruded surfaces 12 and 13. Likewise, the outer peripheral protruded surfaces 22 and 23 of the outer peripheral surface 20 are high compression portions, and the surface pressure of the contact surface of the sealing device 1 shows distinction in the outer peripheral protruded surfaces 22 and 23. Therefore, in the usage state, peak surface pressure can be generated on the sealed object side and the atmosphere side of the contact surface of the sealing device 1, a surface pressure gradient can be increased, and entry of the sealed object to inside of the contact surface can be made difficult. Thereby, sealing performance of the sealing device 1 can be improved.

Further, as described above, the compression rate of the inner peripheral recessed surface 11 of the sealing device 1 in the usage state is 0% or more, and the compression rate of the outer peripheral recessed surface 21 of the sealing device 1 in the usage state is 0% or more. Therefore, a rotational reaction force that occurs to the contact surface can be reduced, while the contact surface is increased as described above, driving torque of the shaft 50 or the housing 60 can be reduced, and wear of the sealing device 1, the bottom surface 51c of the groove 51, or the inner peripheral surface 61a of the shaft hole 61 can be reduced.

Further, as described above, the sealing device 1 has the inner peripheral recessed surface 11 and the outer peripheral recessed surface 21 on the contact surface, the contact surface pressure in the usage state decreases from the sealed object side toward the atmosphere side, and the surface pressure increases from the bottom-most portion 11a of the inner peripheral recessed surface 11 and the bottom-most portion 21a of the outer peripheral recessed surface 21. Therefore, for example, at the time of switching of the direction of rotation of the shaft 50 or the housing 60, or when the attaching targets stop moving, the sealed object that enters toward the atmosphere side from the sealed object side can be returned to the sealed object side. Thereby, oozing and leakage of the sealed object can be suppressed. When another object to be sealed is sealed in the space on the atmosphere side, oozing and leakage of the other sealed object can also be suppressed similarly.

In the inner peripheral recessed surface 11, the bottom-most portion 11a is located in the center or substantially center in the axis x direction, and in the outer peripheral recessed surface 21, the bottom-most portion 21a is located in the center or substantially center in the axis x direction. Therefore, the sealing device 1 can exhibit an action of returning the sealed object described above similarly on the sealed object side and the atmosphere side of the inner peripheral recessed surface 11 and the outer peripheral recessed surface 21. Therefore, the sealing device 1 can be favorably used for an attaching target where another object to be sealed is also sealed in the space on the atmosphere side in addition to the space on the sealed object side.

In this way, according to the sealing device 1 according to the first embodiment of the present disclosure, it is possible to improve sealing performance concerning oozing and leakage based on bidirectional rotational movement of the shaft 50 or the housing 60, of the sealing device 1.

Thereafter, a sealing device 2 according to a second embodiment of the present disclosure will be described.

Figure 6:
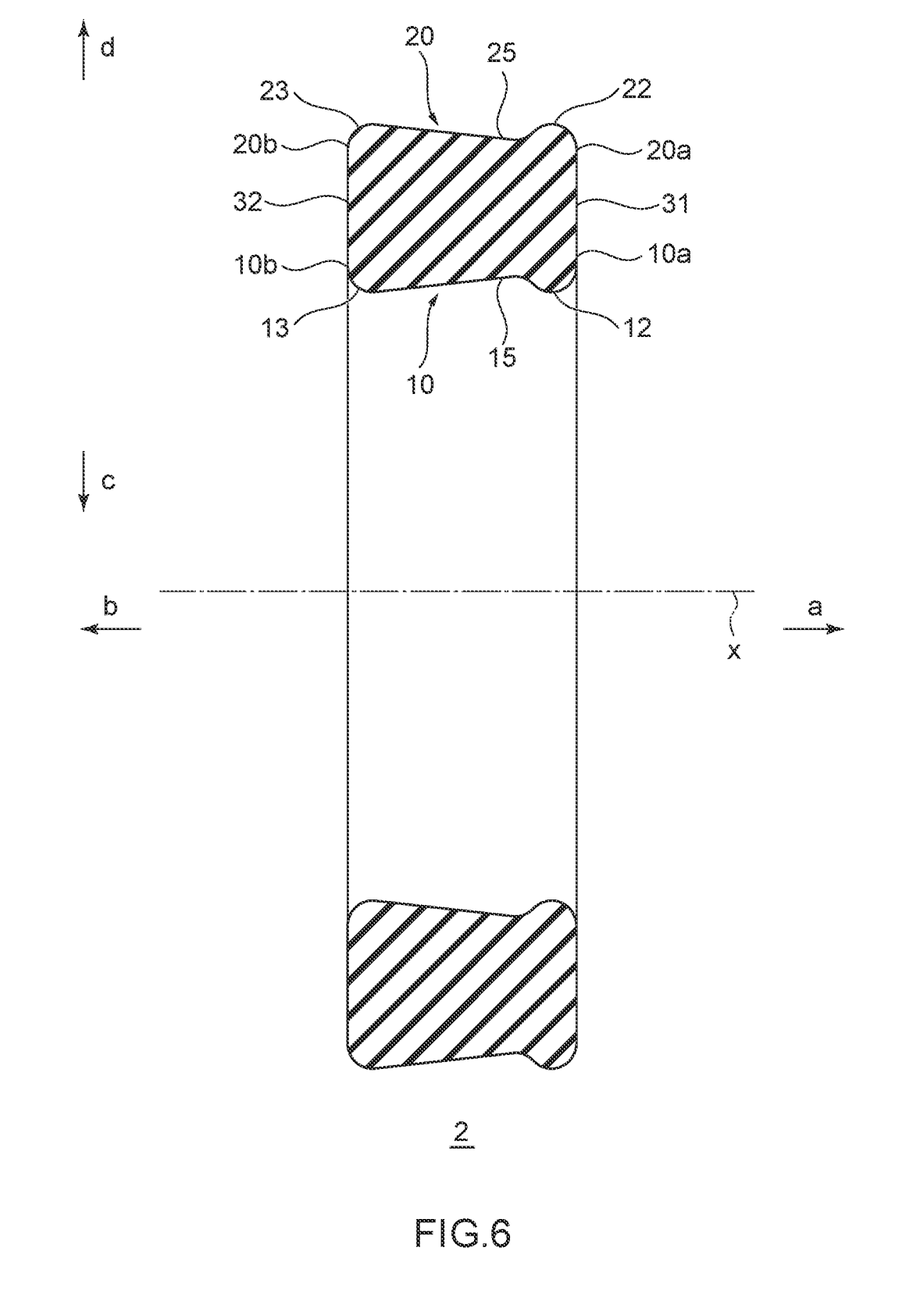
FIG. 6 A sectional view in a section along an axis of a sealing device according to a second embodiment of the present disclosure.
Figure 7:
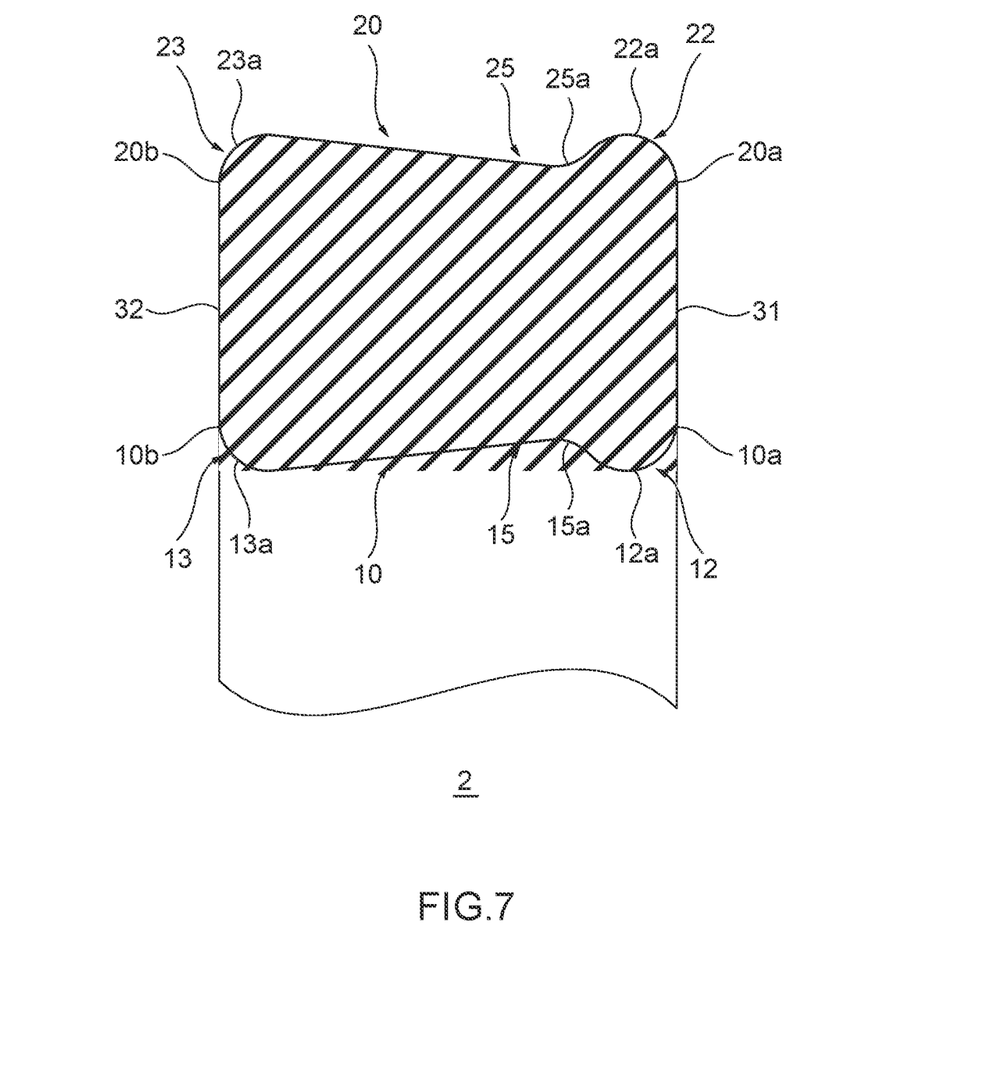
FIG. 7 A sectional view enlarging and illustrating one side of the section illustrated in FIG. 6.

FIG. 6 is a sectional view in a section along an axis x of the sealing device 2 according to the second embodiment of the present disclosure, and FIG. 7 is a sectional view enlarging and illustrating one side of a section of the sealing device 2. The sealing device 2 according to the second embodiment of the present disclosure differs from the sealing device 1 according to the first embodiment of the present disclosure described above in the forms of the inner peripheral recessed surface and the outer peripheral recessed surface and has an inner peripheral recessed surface 15 and an outer peripheral recessed surface 25 that are different from the inner peripheral recessed surface 11 and the outer peripheral recessed surface 21 of the aforementioned sealing device 1. Hereinafter, concerning components of the sealing device 2, the components having the same configurations as or similar functions to the aforementioned sealing device 1 are assigned with the same reference signs to omit explanation thereof, and different components are be described.

As illustrated in FIGS. 6 and 7, the inner peripheral recessed surface 15 of an inner peripheral surface 10 of the sealing device 2 is recessed to an outer periphery side similarly to the inner peripheral recessed surface 11 of the inner peripheral surface 10 of the sealing device 1, and has a bottom-most portion 15a corresponding to the bottom-most portion 11a of the inner peripheral recessed surface 11. The bottom-most portion 15a is a portion located in a position farthest from the axis x in a direction orthogonal to the axis x, of the inner peripheral recessed surface 15, in a section. A sectional shape of the inner peripheral recessed surface 15 is different from the sectional shape of the inner peripheral recessed surface 11, and the bottom-most portion 15a is not located in a center or substantially center in the axis x direction. The sectional shape of the inner peripheral recessed surface 15 is not symmetrical or substantially symmetrical about the bottom-most portion 15a. In the section, the bottom-most portion 15a is provided on the sealed object side in the axis x direction of the inner peripheral recessed surface 15. In other words, in the section, the bottom-most portion 15a is provided on the sealed object side from the center in the axis x direction of the inner peripheral recessed surface 15.

The inner peripheral recessed surface 15 has a shape such as a shape that presents an outline drawn by a curved line in the section, a shape that presents an outline drawn by a combination of straight lines in the section, or a shape that presents an outline drawn by a combination of a curved line and a straight line in the section. However, the inner peripheral recessed surface 15 preferably has a shape that draws a smooth line in the section. As described above, in the section, the bottom-most portion 15a of the inner peripheral recessed surface 15 is provided on the sealed object side, and a width in the axis x direction is larger in a portion on the atmosphere side from the bottom-most portion 15a of the inner peripheral recessed surface 15 than a portion on the sealed object side from the bottom-most portion 15a of the inner peripheral recessed surface 15.

As illustrated in FIGS. 6 and 7, the outer peripheral recessed surface 25 of an outer peripheral surface 20 of the sealing device 2 is recessed to an inner periphery side similarly to the outer peripheral recessed surface 21 of the outer peripheral surface 20 of the sealing device 1, and has a bottom-most portion 25a corresponding to the bottom-most portion 21a of the outer peripheral recessed surface 21. The bottom-most portion 25a is a portion located in a position closest to the axis x in a direction orthogonal to the axis x, of the outer peripheral recessed surface 25, in the section. A sectional shape of the outer peripheral recessed surface 25 is different from the sectional shape of the outer peripheral recessed surface 21, and the bottom-most portion 25a is not located in a center or substantially center in the axis x direction. The sectional shape of the outer peripheral recessed surface 25 is not symmetrical or substantially symmetrical about the bottom-most portion 25a. In the section, the bottom-most portion 25a is provided on the sealed object side in the axis x direction of the outer peripheral recessed surface 25. In other words, in the section, the bottom-most portion 25a is provided on the sealed object side from the center in the axis x direction of the outer peripheral recessed surface 25.

The outer peripheral recessed surface 25 has a shape such as a shape that presents an outline drawn by a curved line in the section, a shape that presents an outline drawn by a combination of straight lines in the section, or a shape that presents an outline drawn by a combination of a curved line and a straight line in the section. However, the outer peripheral recessed surface 25 preferably has a shape that draws a smooth line in the section. As described above, in the section, the bottom-most portion 25a of the outer peripheral recessed surface 25 is provided on the sealed object side, and a width in the axis x direction is larger in a portion on the atmosphere side from the bottom-most portion 25a of the outer peripheral recessed surface 25 than a portion on the sealed object side from the bottom-most portion 25a of the outer peripheral recessed surface 25.

The sealing device 2 is formed so that the inner peripheral recessed surface 15 contacts the bottom surface 51c of the groove 51 of the shaft 50 in the usage state where the sealing device 2 is attached to the attaching targets, similarly to the sealing device 1. Further, the sealing device 2 is formed so that the outer peripheral recessed surface 25 contacts the inner peripheral surface 61a of the shaft hole 61 in the usage state of the sealing device 2 similarly to the sealing device 1. In other words in the usage state of the sealing device 2 described later, in a range of the inner peripheral recessed surface 15 and the outer peripheral recessed surface 25, the sealing device 2 is sandwiched between the bottom surface 51c of the groove 51 of the shaft 50 and the inner peripheral surface 61a of the shaft hole 61, and a compression rate in the direction orthogonal to the axis x or the direction substantially orthogonal to the axis x is 0% or more.

In the section of the sealing device 2, the inner peripheral recessed surface 15 and the outer peripheral recessed surface 25 are symmetrical or substantially symmetrical about a straight line parallel to the axis x. In the section of the sealing device 2, the inner peripheral recessed surface 15 and the outer peripheral recessed surface 25 do not have to be symmetrical about the straight line parallel to the axis x.

Thereafter, an operation of the sealing device 2 having the aforementioned configuration will be described.

Figure 8:
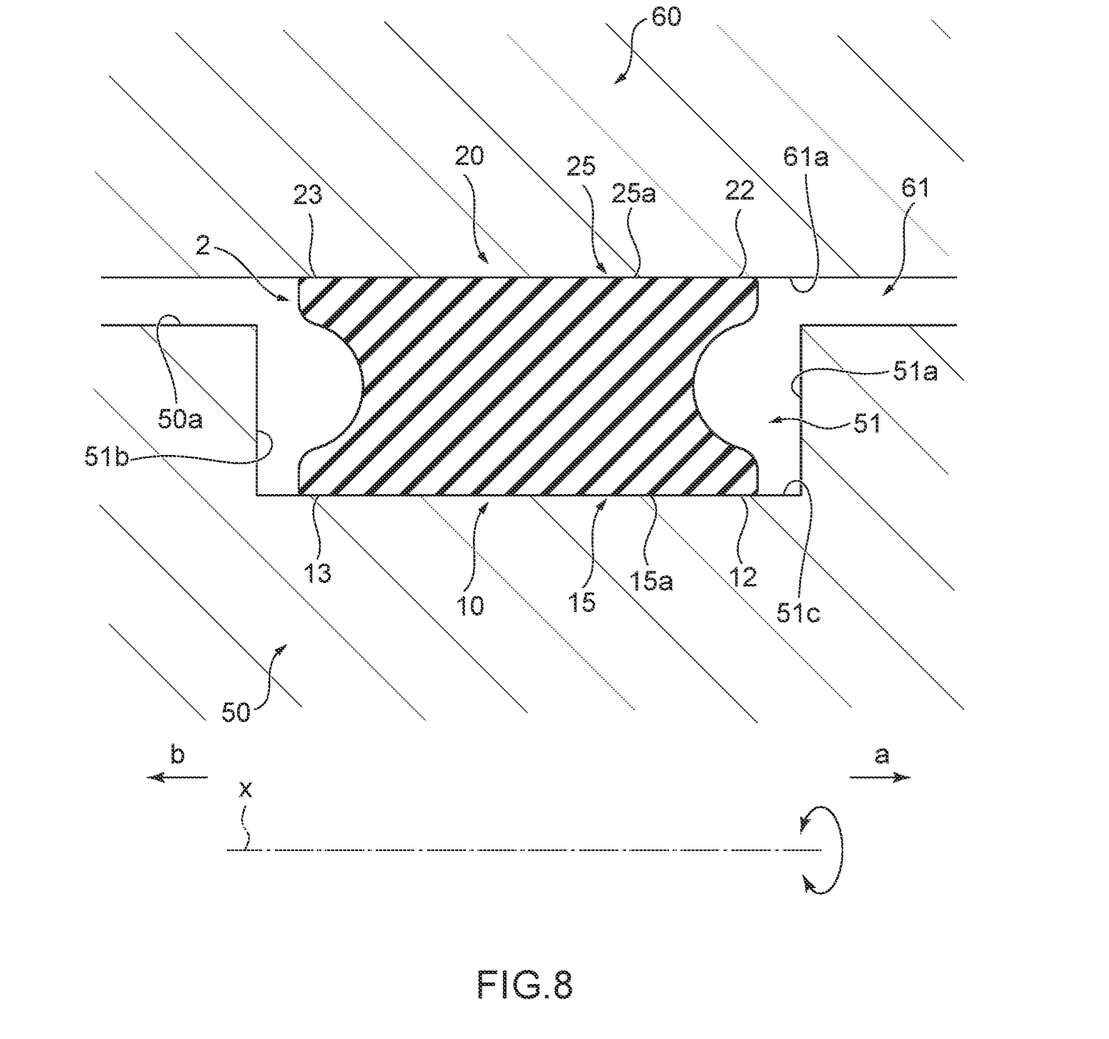
FIG. 8 A sectional view illustrating the sealing device in a usage state where the sealing device illustrated in FIG. 6 is attached to a shaft and a shaft hole of a housing that are attaching targets.

The sealing device 2 is used to seal an annular space between a shaft and a shaft hole in which the shaft is inserted, similarly to the aforementioned sealing device 1. In the usage state, the sealing device 2 is accommodated in the groove 51 of the shaft 50 to seal an annular space between the shaft 50 and the shaft hole 61 in which the shaft 50 is inserted, as illustrated in FIG. 8, for example. Note that FIG. 8 is a sectional view illustrating the sealing device 2 in the usage state where the sealing device 2 is attached to the shaft 50 and the shaft hole 61 of the housing 60 that are attaching targets.

In the usage state, the sealing device 2 operates similarly to the aforementioned sealing device 1 and exhibits similar effects.

Further as described above, in the section, the bottom-most portion 15a is provided on the sealed object side from the center in the axis x direction of the inner peripheral recessed surface 15, and a width in the axis x direction of a portion on the atmosphere side from the bottom-most portion 15a of the inner peripheral recessed surface 15 is larger than a width in the axis x direction of a portion on the sealed object side from the bottom-most portion 15a of the inner peripheral recessed surface 15. Therefore, even when the sealed object enters the portion on the contact surface from the sealed object side at a time of switching of the rotation direction of the shaft 50 or the housing 60 or when the shaft 50 or the housing 60 is stationary, the action of returning the sealed object that has entered to the sealed object side works in a wide range, and the action of returning the sealed object to the sealed object side can be improved since the width in the axis x direction of the portion on the atmosphere side from the bottom-most portion 15a of the inner peripheral recessed surface 15 is large.

Further, as described above, in the section, the bottom-most portion 25a is provided on the sealed object side from the center in the axis x direction of the outer peripheral recessed surface 25, and a width in the axis x direction of a portion on the atmosphere side from the bottom-most portion 25a of the outer peripheral recessed surface 25 is larger than a width in the axis x direction of a portion on the sealed object side from the bottom-most portion 25a of the outer peripheral recessed surface 25. Therefore, even when the sealed object enters the portion on the contact surface from the sealed object side at a time of switching the rotation direction of the shaft 50 or the housing 60 or when the shaft 50 or the housing 60 is stationary, the action of returning the sealed object that has entered to the sealed object side works in a wide range, and the action of returning the sealed object to the sealed object side can be improved, since the width in the axis x direction of the portion on the atmosphere side from the bottom-most portion 25a of the outer peripheral recessed surface 25 is large.

As above, according to the sealing device 2, the action of returning the sealed object to the sealed object side on the inner peripheral recessed surface 15 and the outer peripheral recessed surface 25 can be improved, and sealing performance can be more improved. Therefore, the sealing device 2 can be favorably used for the attaching target in which another object to be sealed is not sealed on the atmosphere side.

As above, according to the sealing device 2 according to the second embodiment of the present disclosure, it is possible to improve sealing performance concerning oozing and leakage of the sealed object based on the bidirectional rotational movement of the shaft 50 or the housing 60, of the sealing device 2.

Although the embodiments of the present disclosure are described thus far, the present disclosure is not limited to the sealing devices 1 and 2 according to the embodiments of the present disclosure described above, and includes all aspects included in the idea and the claims of the present disclosure. Further, the respective components may be selectively combined appropriately to exhibit at least part of the aforementioned object and effects. For example, the shapes, materials, arrangements, sizes and the like of the respective components in the above-described embodiments can be changed as appropriate according to a specific usage aspect of the present disclosure.

The invention claimed is:

1. A sealing assembly, comprising:
    a housing having a shaft hole;
    a shaft accommodated within the shaft hole of the housing; and
    a sealing device that is annular around an axis and seals an annular space between the shaft and the shaft hole in which the shaft is inserted,
    the sealing device including:
    an inner peripheral surface configured to contact the shaft;
    an outer peripheral surface configured to contact a surface of the housing; and
    a first side surface extending between the inner peripheral surface and the outer peripheral surface at one end of the sealing device, and a second side surface extending between the inner peripheral surface and the outer peripheral surface at another end of the sealing device that is opposite the one end;
    and wherein
    the inner peripheral surface has an inner peripheral recessed surface that is a surface recessed to the outer periphery side and annular around the axis,
    the outer peripheral surface has an outer peripheral recessed surface that is a surface recessed to the inner periphery side and annular around the axis,
    the inner peripheral recessed surface of the inner peripheral surface contacts the shaft, and
    the outer peripheral recessed surface of the outer peripheral surface contacts the surface of the housing,
    wherein
        in a section along the axis of the sealing device, a portion located in a position farthest from the axis in a direction orthogonal to the axis, of the inner peripheral recessed surface is provided on one side in the axis direction, of the inner peripheral recessed surface, and
        in the section along the axis of the sealing device, a portion located in a position closest to the axis in the direction orthogonal to the axis, of the outer peripheral recessed surface is provided on the one side in the axis direction, of the outer peripheral recessed surface,
    the one side in the axis direction is a side to be a side of a sealed object,
    wherein by the inner peripheral recessed surface, inner peripheral protruded surfaces that are a pair of surfaces that protrude toward the inner periphery side and are annular around the axis are formed on both ends of the inner peripheral surface in the axis direction, and by the outer peripheral recessed surface, outer peripheral protruded surfaces that are a pair of surfaces that protrude toward the outer periphery side and are annular around the axis are formed on both ends of the outer peripheral surface in the axis direction,
    wherein in the section along the axis of the sealing device, the inner peripheral surface is inclined from the portion located in the position farthest from the axis toward the inner peripheral protruded surfaces on the other side in the axial direction, and the outer peripheral surface is inclined from the portion located in the position closest to the axis toward the outer peripheral protruded surfaces on the other side in the axial direction,
    in a usage state of the sealing device, an entirety of the inner peripheral recessed surface contacts the shaft, an entirety of the outer peripheral recessed surface contacts the surface of the housing, and the first side surface and the second side surface form recesses, and
    in a free state of the sealing device, the pair of surfaces that protrude toward the inner periphery side are at a same position in a direction perpendicular to the axis, the pair of surfaces that protrude toward the outer periphery side are at a same position in the direction perpendicular to the axis, wherein the first side surface and the second side surface are entirely planar and extend in the direction perpendicular to the axis.

2. The seal assembly according to claim 1, wherein
the shaft or the shaft hole of the housing performs bidirectional rotational movement.

* * * * *